DeW C. FARRINGTON.
MACHINE GUN.

No. 179,450.

2 Sheets—Sheet 1.

Patented July 4, 1876.

Witnesses.
John Cassels.
J. E. Major.

Inventor.
De Witt C. Farrington

DeW C. FARRINGTON.
MACHINE GUN.

No. 179,450. Patented July 4, 1876.

Witnesses.
John Cassels.
T. E. Major.

Inventor.
De Witt C. Farrington

UNITED STATES PATENT OFFICE.

DE WITT C. FARRINGTON, OF LOWELL, MASSACHUSETTS.

IMPROVEMENT IN MACHINE-GUNS.

Specification forming part of Letters Patent No. 179,450, dated July 4, 1876; application filed April 25, 1876.

*To all whom it may concern:*

Be it known that I, DE WITT C. FARRINGTON, of the city of Lowell, county of Middlesex, and Commonwealth of Massachusetts, have invented certain new and useful Improvements in the Method of Operating and Oscillating the Barrels of Automatic or Machine Guns, and feeding the cartridges to the same; and I do hereby declare that the following is a full, clear, and exact description thereof, such that a person skilled in the art to which it appertains may be able to make and use the same.

For its description reference is made to the drawings hereto attached, and forming part of this specification.

Figure 1:
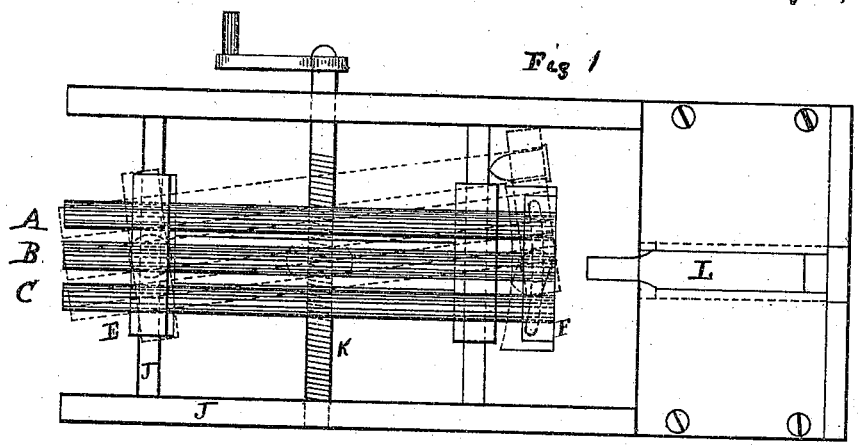
Figure 2:
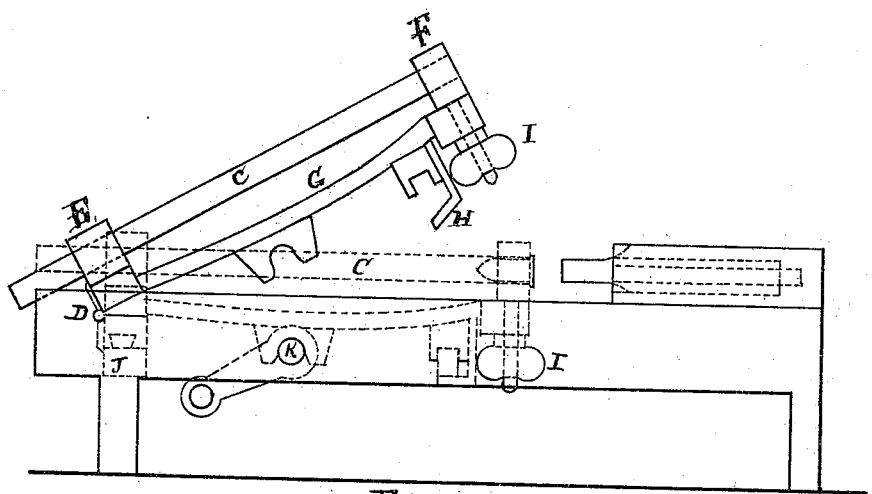

Figure 1 is a horizontal longitudinal section of a portion of a machine-gun, showing three barrels, A B C, arranged parallel to each other in cross-bars E and F. The cross-bar E rests upon and is pivoted to the frame G, allowing the barrels to be thrown aside from the lock or plunger L, as shown by the dotted lines in Fig. 1. The cross-bar F rests upon the frame G, and is held in position by a thumb-screw, I, or any other suitable contrivance. The frame G is hinged at D, Fig. 2, allowing the barrels to be tilted by releasing the hook H or other fastening, as shown in Fig. 2. The frame G being attached to the frame-work of the gun J by grooves, it may be traversed by the crank and screw K, or any other suitable mechanism.

The object of moving the barrels aside or tilting them, as shown in Figs. 1 and 2, is to allow them to be more easily and readily inspected, cleaned, or cleared of any obstruction, or entirely removed from the gun, than if firmly fixed, as in many other machine-guns.

The object of traversing the barrels is the same as above stated, and also for the purpose of moving any one of them aside when it shall become heated by firing, or disabled by any cause, and another barrel brought into use.

The barrels may be arranged as shown in Fig. 1, or placed one above another, and may be operated by any suitable means other than those described.

In a patent granted to me for improvements in machine-guns dated July 6, 1875, I show a series of barrels hung in a revolving frame, by which one barrel may be moved aside and another brought into use.

Figure 3:
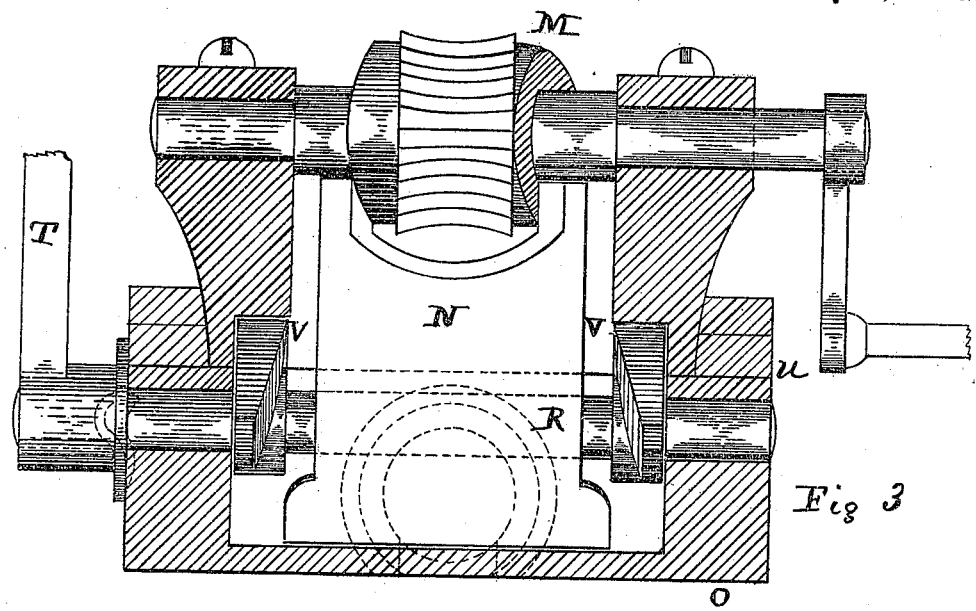
Figure 4:
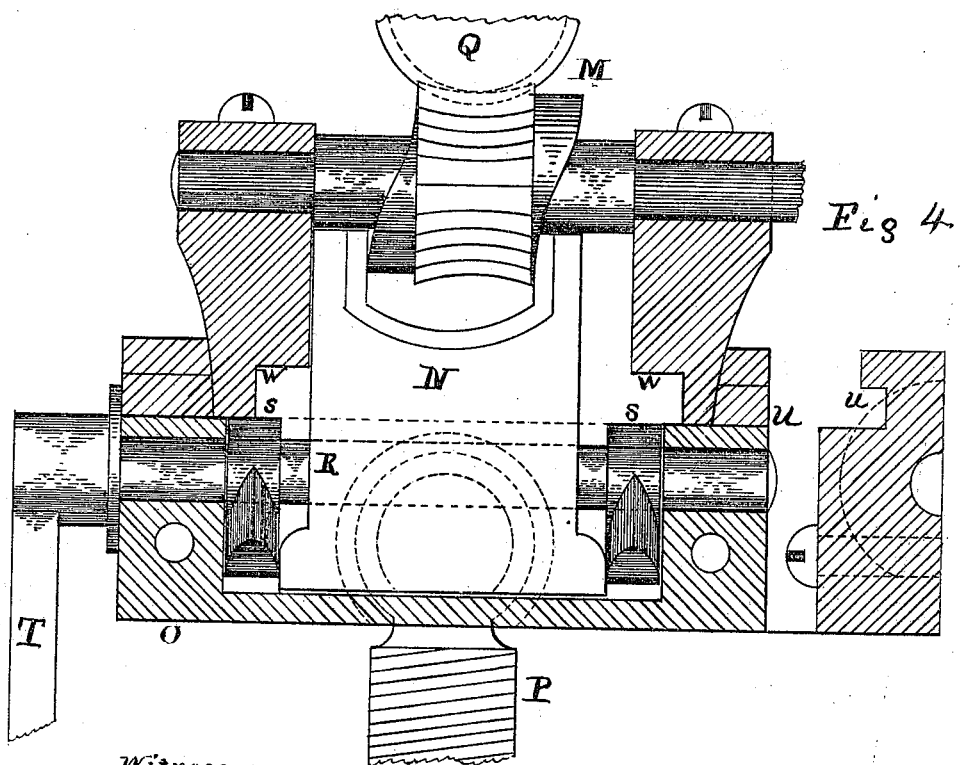

My present invention is for the purpose of using a gang of barrels, which I consider an improvement for some kinds of guns. Figs. 3 and 4 represent a rear view of the mechanism for oscillating the barrels as attached to a gun. Letter M represents a pinion moved by a worm-gear attached to the gun, and partially shown at Q. This pinion M has inclined or beveled sides, which work in a slot in the block or saddle N, which works loosely on a shaft, R, in the box O, which is attached to the elevating-screw P of the gun. Upon the shaft R are fixed two segments or buttons, S S, having inclined sides. These buttons may be turned upward or downward by means of the handle T, against a corresponding inclined face on the lower part of the saddle N, and hold it firmly in position, as shown in Fig. 4. As the frame or casing of the gun is attached to the box O by a tongue and groove at U, it is evident that the gun must traverse when the pinion is put in motion.

An inspection of Fig. 3 will show that in case the inclined sides of the buttons S S are turned somewhat away from the corresponding inclined sides of the saddle N, a part of the travel given by the sides of the pinion M will be employed in traversing the block as far as the buttons will allow it to go; consequently the gun will traverse only partly as far as when the saddle is held firmly in one position. Finally, when the buttons are turned up to reach the position V V, as shown in Fig. 3, the saddle N will traverse on its shaft R through the whole of the space allowed in the box being driven by means of the pinion M, and the gun being locked to the box O by the entrance of the buttons into the recesses W W, made for them in the frame or casing, the gun will remain steady, with its axis in the vertical plane passing through the axis of the elevating-screw P. The buttons having their faces beveled or inclined, the degrees covered by the oscillation may be varied as the handle T is more or less turned.

This is one of the most valuable and important features of this part of my invention, as the range or sweep of the gun can be varied at the will of the operator, and without cessation of firing.

I am aware that various devices have been used by which the barrels of a machine-gun have been oscillated; but I believe I am the first inventor of a device which is adjustable, and by which the range or sweep can be varied at will.

Figure 5:
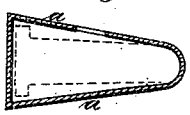
Figure 6:

Fig. 5 represents a cross-section of a feed-case, through which the cartridges are fed to a machine-gun, and Fig. 6 represents a cross-section of the mouth-piece, showing my improvement. The feed-case generally in use is made from some thin metal, the line of a cross-section of which is somewhat like the letter U, as shown at $a$, Fig. 5. This form has been adopted, as the cartridges can be packed therein in a horizontal position. Heretofore the opening or mouth-piece of the feed-case has been substantially of the same form and size as the body of the feed-case.

The bullet end of a cartridge being heavier than the other end, it is liable to fall from the feed-case point downward, thereby clogging and preventing the rotation of the carrier-roll.

My invention consists in reducing the opening or mouth-piece of a feed-case to correspond to the size and form of the cartridge, so that the cartridge must leave the case in a horizontal position. (See Fig. 6.) This form of mouth-piece may be readily attached to the feed-cases now in use, and the dotted line in Fig. 5 shows the form of the opening of the feed-case when my improved mouth-piece is attached.

What I claim is—

1. A machine-gun with barrels tilting up at the rear independently of the breech mechanism, substantially as and for the purposes set forth.

2. The combination of the barrels A B C, the frame G, the hinge D, and the hook H, substantially as and for the purposes set forth.

3. The combination of the pivoted barrels A B C with the frame G, substantially as and for the purposes set forth.

4. The combination, with the barrels or frame carrying the barrels of a machine-gun, of the saddle N and the bevel-faced pinion M, as described.

5. The combination of the saddle N with the buttons S S, substantially as and for the purposes set forth.

6. The combination of the saddle N, the casing or frame, the beveled pinion M, and buttons S S, as and for the purposes specified.

7. The combination of the adjustable saddle N and the frame or casing, substantially as set forth.

8. The combination of the buttons S S and the frame or casing, as set forth.

9. The combination of the saddle N, the frame or casing, and the buttons S S, as set forth.

10. In combination with a feed-case for machine-guns, a mouth-piece, a longitudinal cross-section of the interior of which is substantially of the form and size of a central longitudinal cross-section of the cartridge to be used therein, as set forth.

DE WITT C. FARRINGTON.

Witnesses:
JOHN CASSELS,
T. E. MAJOR.